No. 721,304. PATENTED FEB. 24, 1903.
F. G. HUGHES.
COUPLING DEVICE.
APPLICATION FILED DEC. 22, 1902.
NO MODEL. 3 SHEETS—SHEET 3.
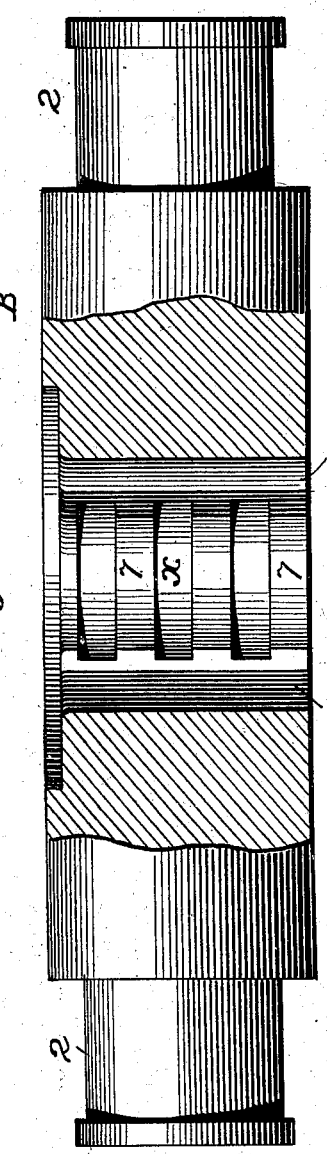
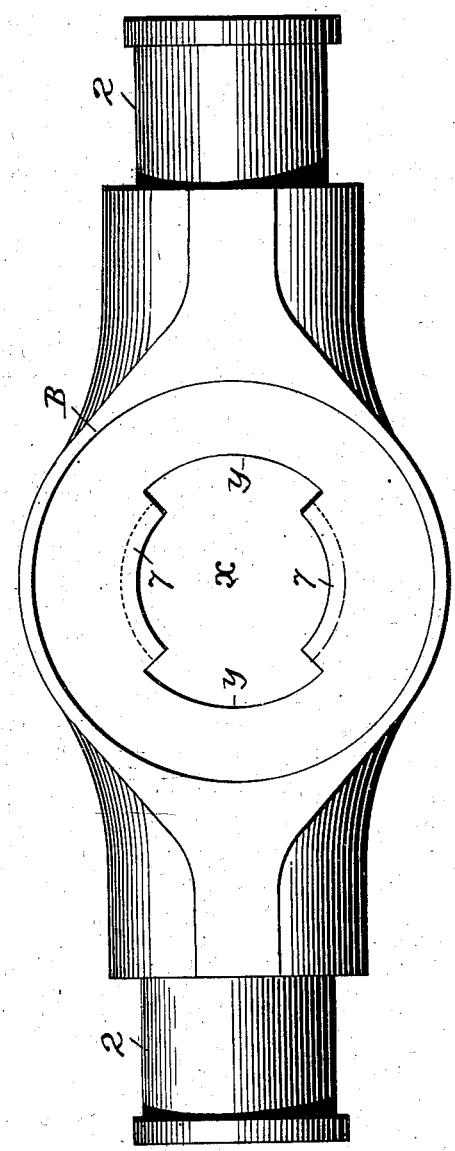

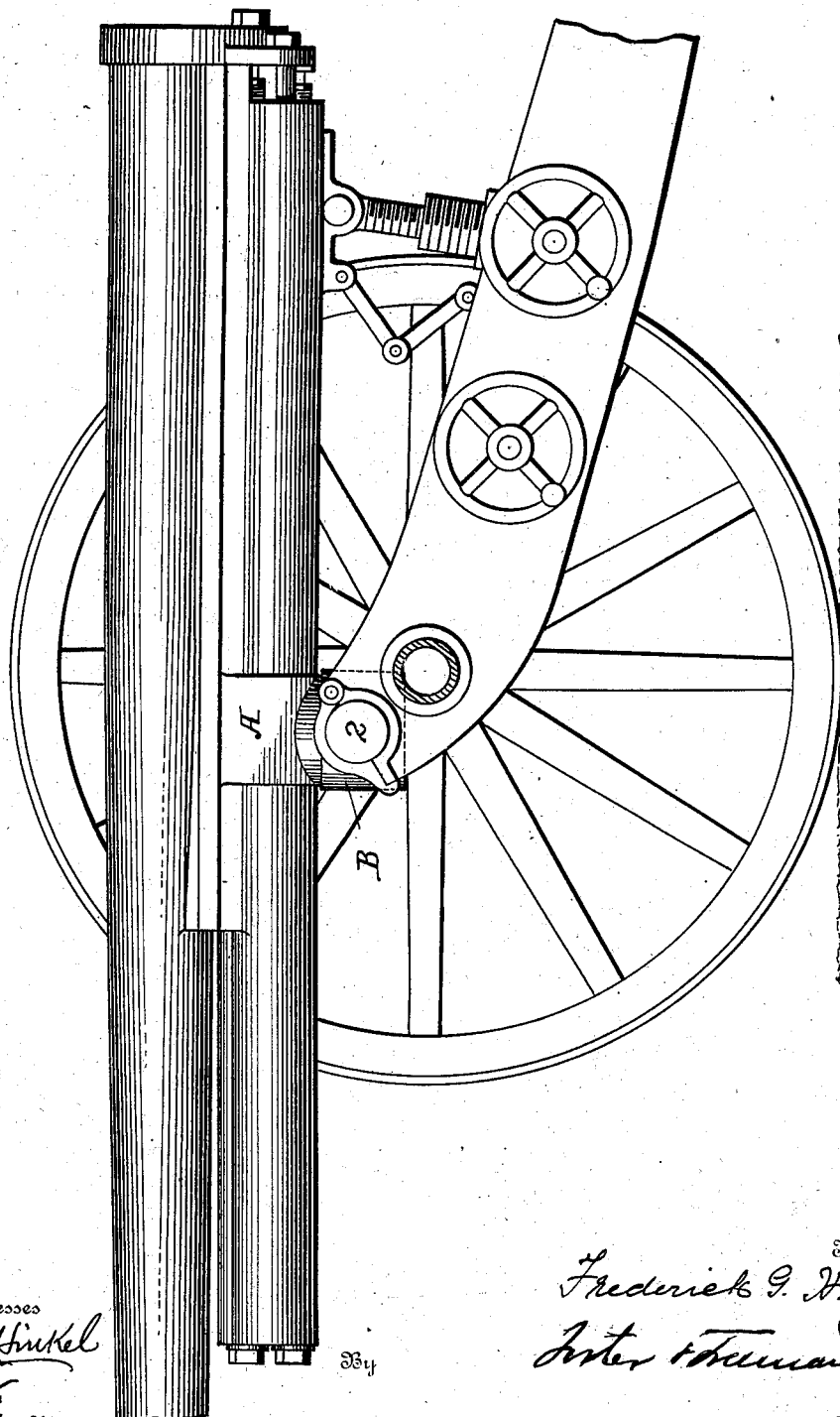

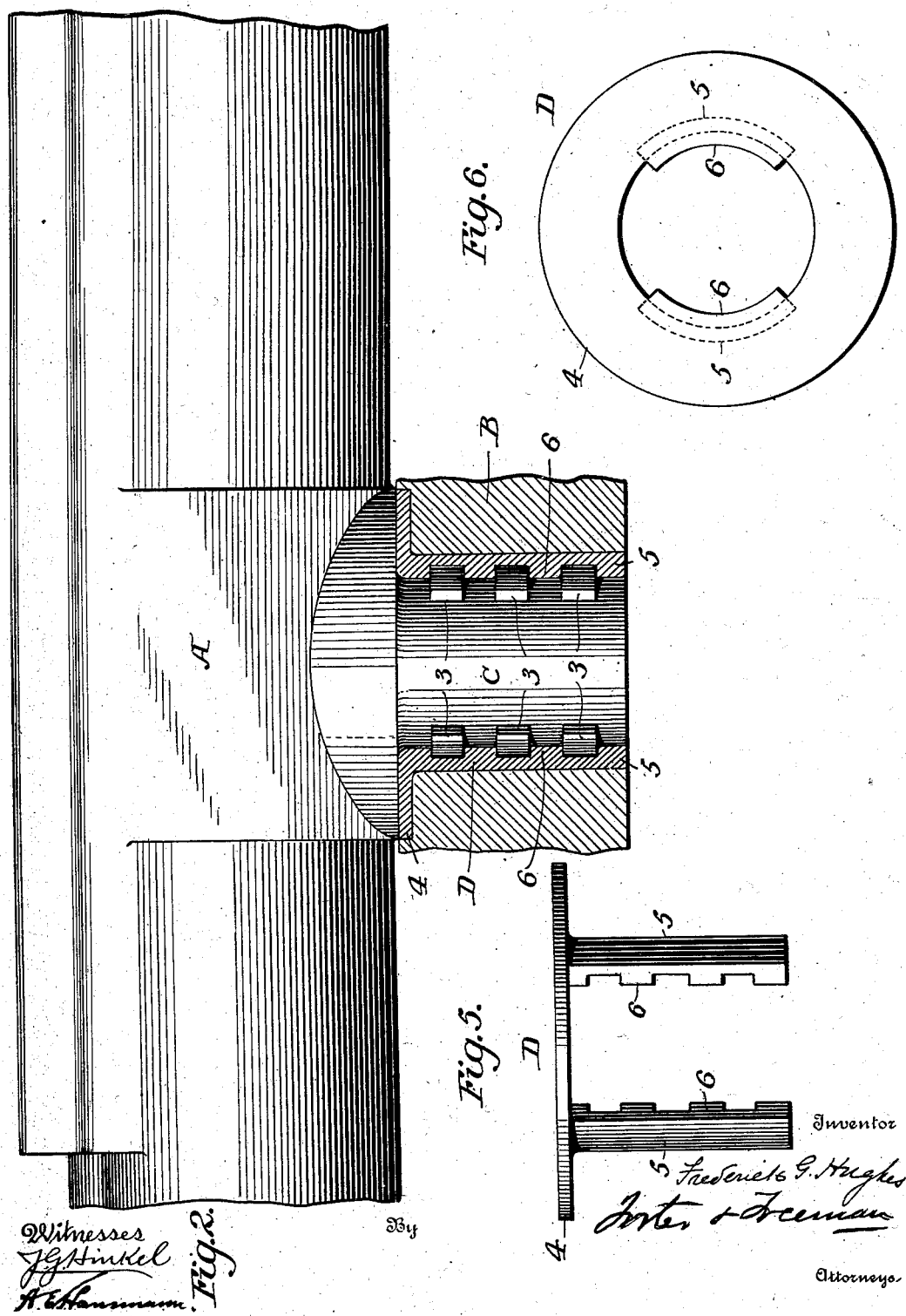

UNITED STATES PATENT OFFICE.

FREDERICK G. HUGHES, OF BETHLEHEM, PENNSYLVANIA, ASSIGNOR TO BETHLEHEM STEEL COMPANY, OF SOUTH BETHLEHEM, PENNSYLVANIA, A CORPORATION OF PENNSYLVANIA.

COUPLING DEVICE.

SPECIFICATION forming part of Letters Patent No. 721,304, dated February 24, 1903.

Application filed December 22, 1902. Serial No. 136,301. (No model.)

*To all whom it may concern:*

Be it known that I, FREDERICK G. HUGHES, a citizen of the United States, residing at Bethlehem, in the county of Northampton and State of Pennsylvania, have invented certain new and useful Improvements in Coupling Devices, of which the following is a specification.

My invention is a coupling device for connecting two members, as a gun and a yoke, to permit one to swing independently of the other which supports it, while securely connecting the two within certain limits of motion of the swinging member, but permitting the detachment of the latter when carried to positions beyond said limits; and my invention consists in providing one member with a collared pintle and the other with a socket having internal ribs and adapting a ribbed bushing to said socket and pintle, as fully set forth hereinafter and illustrated in the accompanying drawings, in which—

Figure 1 is a side elevation of a gun and gun-carriage embodying my improvements. Fig. 2 is a side view of the pintle member or cradle with the yoke and bushing in section, the cradle being in parallel position with respect to the yoke. Fig. 3 is a side view, in part section, of the socket-piece or yoke; Fig. 4, a plan of the socket-piece; Fig. 5, a side view of the bushing, and Fig. 6 a plan view of the bushing.

The gun A is provided with a pintle C, which turns in a socket $x$ of a socket-piece, which, as shown, is a yoke B, which terminates in trunnions 2 2. As shown, the pintle is on the cradle of the gun.

To permit the free swing of the gun, yet firmly connect the two parts together and form a practically tight and dust-proof joint, I provide the pintle with a series of interrupted collars 3, with alternate sections and spaces of equal length, and to this collared pintle I apply a bushing D. The bushing consists of a ring portion 4, with two separate segments 5 5, each of a width to fit between the separated collar-sections 3 of the pintle, and at the inner face of each segment 5 is a series of parallel curved ribs 6, equal in thickness to the width of the spaces between the collar-sections 3 and so arranged that when the bushing is applied to the pintle the ribs of the bushing will be opposite the spaces between the collar-sections on the pintle. The bushing may now be turned a quarter-revolution, bringing its curved ribs between the curved collar-sections of the pintle, as shown in Fig. 2.

The socket-piece or yoke B is enlarged centrally, and its socket $x$ is provided with two opposite series of separated ribs 7 7, the spaces $y$ $y$ between the ends of the ribs being adapted to receive the segments 5 5 of the bushing. The gun is brought above and parallel to the yoke, and the pintle, with the bushing applied thereto as described, is now passed into the socket $x$, the segments 5 5 of the bushing passing into the recesses $y$ $y$ until the ring 4 rests on the upper face of the yoke. The gun is now turned to a position transverse to the yoke, when the pintle will be turned with it, carrying its collar-sections 3 3 from between the ribs 6 of the bushing and into position between the ribs 7 7 of the yoke, so that when the gun is at right angles to the yoke the collar-sections 3 of the pintle will be in entire engagement with the ribs 7 of the yoke, the parts being thus locked firmly together, while the cradle can turn freely, the segments 5 5 of the bushing closing the spaces between the collar-sections 3.

It will be seen that the lower collar-sections 3 are above the end of the pintle, so that when the yoke and cradle are joined the lower ribs 7 of the yoke will lie below the lower collar-sections 3, while the lower ribs 6 of the bushing will fill the spaces between the lower ribs 7, thus bringing all parts flush at all points with the lower face of the yoke and making a dust-proof joint. The same result is secured in like manner at the top of the bushing.

It will be evident that the collar-sections may be divided into two or more separated sections and that although I have shown the separable connection as applied to connecting the cradle and the yoke of a gun it may connect the gun itself and any other socket-piece or may be used whenever two parts are to be connected to permit one to swing independently of the other through a limited arc, securing a positive connection within the said arc, but permitting ready detachment when the limits of the arc are exceeded.

Without limiting myself to the precise construction shown, I claim—

1. The combination in a coupling device, of a member having a pintle provided with interrupted collars, a member having a socket with sectional curved ribs adapted to receive the collars between them, and a bushing with grooves adapted to receive the said collars, substantially as set forth.

2. The combination in a coupling device, of a member having a socket with a series of curved separated ribs at opposite sides, a bushing with segments fitting between the ribs and having ribs corresponding to those of the socketed member, and a swinging member with a pintle fitting said socket and having interrupted collars adapted to the spaces between the ribs of the socket-piece and the bushing, substantially as set forth.

3. The combination with a gun having a pintle with interrupted collars, and a socket-piece having a socket with separated ribs, and a removable bushing with ribs forming continuations of those of the socket-piece, the ribs and collars being so arranged that the collars of the pintle are between the ribs of the socket-piece when the gun is in firing position, substantially as set forth.

4. The combination with the cradle of a gun, of a pintle having interrupted collars, a yoke having a socket with separated ribs at its front and back sides adapted to receive the said collars between them when the gun is in firing position, and a bushing having segments fitting between the ribs of the yoke and with corresponding ribs, the lower ribs of the yoke and bushing completely inclosing the lower end of the pintle and filling the socket in the yoke, substantially as set forth.

5. The combination with the gun, its pintle, collar-sections thereon, and a yoke having a socket with separated ribs, of a bushing consisting of a ring and segments connected therewith and provided with ribs corresponding to those of the yoke, substantially as set forth.

In testimony whereof I have signed my name to this specification in the presence of two subscribing witnesses.

FREDERICK G. HUGHES.

Witnesses:
WM. L. ACHENBACH,
E. B. HOFFMAN.